Patented Mar. 11, 1924.

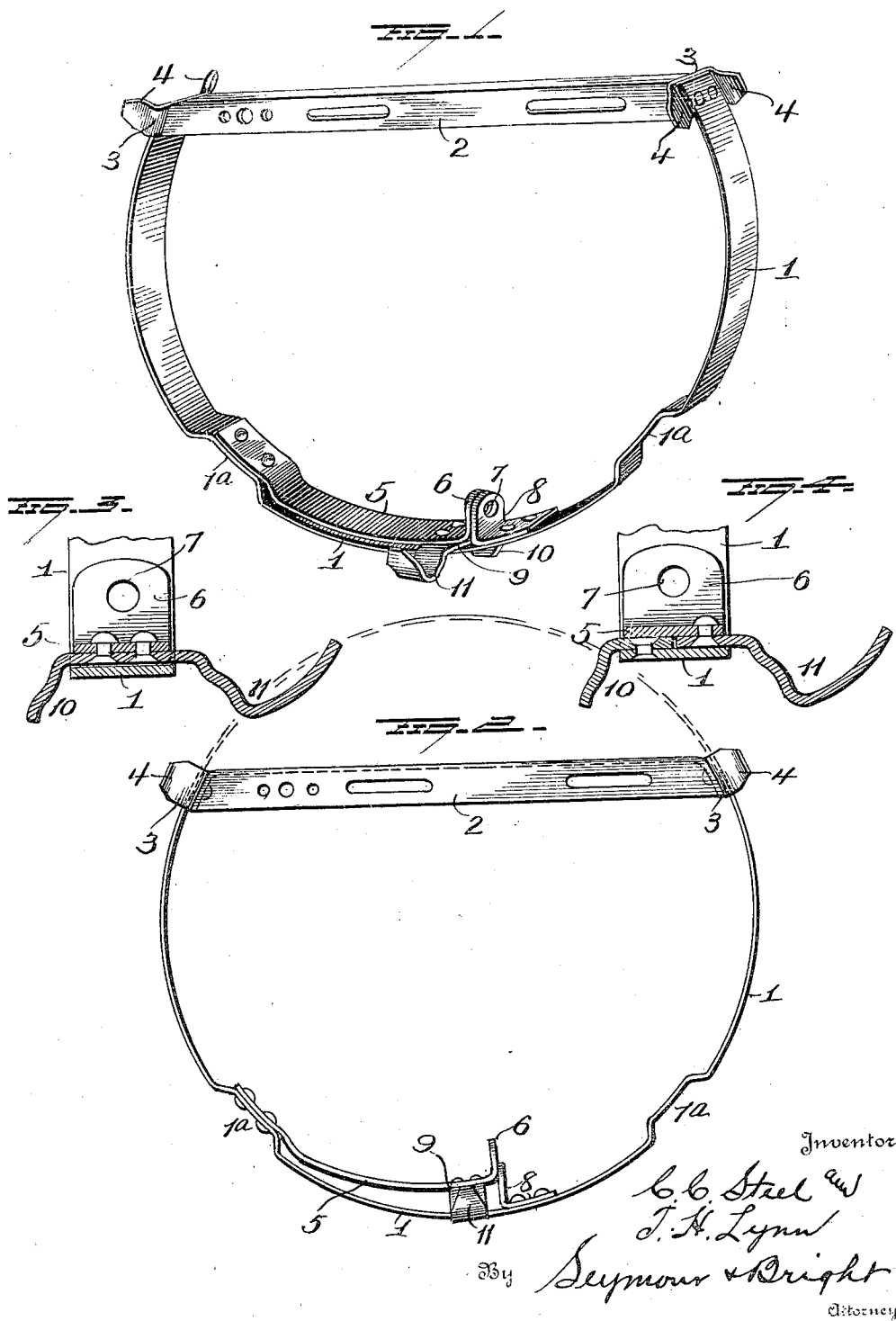

1,486,397

UNITED STATES PATENT OFFICE.

CHARLES C. STEEL AND THOMAS H. LYNN, OF WILLIAMSPORT, PENNSYLVANIA.

TIRE CARRIER FOR AUTOMOBILES.

Application filed October 15, 1921. Serial No. 507,885.

*To all whom it may concern:*

Be it known that we, CHARLES C. STEEL and THOMAS H. LYNN, citizens of the United States, and residents of Williamsport, in the county of Lycoming and State of Pennsylvania, have invented certain new and useful Improvements in Tire Carriers for Automobiles; and we do hereby declare the following to be a full, clear, and exact description of the invention, such as will enable others skilled in the art to which it appertains to make and use the same.

This invention relates to improvements in tire carriers, the object being to provide simple and effective means, which can be cheaply constructed and assembled, for securing a rim or tire to the carrier so as to prevent the unauthorized removal of the rim.

With this object in view our invention consists in the parts and combination of parts and in the details of construction as will be more fully explained and pointed out in the claims.

In the accompanying drawings; Figure 1 is a view in elevation of a rim or tire carrier embodying our invention, the rim locking member being shown in its normal or locking position; Figure 2 is a similar view showing the spring saddle sprung into position to permit of the placement of a rim or tire on the carrier; Figure 3 is a view in cross section through the carrier and spring controlled saddle, and Figure 4 is a view of a modified construction.

The body of the carrier consists of a metal band or strap 1 bent into the form of a circle or into the segment of a circle as may be preferred. In the drawings we have shown it in the form of a segment greater than a half circle, with its free ends connected by an angle bar 2.

Fixed or rigid saddles 3 having rim engaging bent ends 4 are located at the juncture of said band or strap 1 and the angle bar, and one member of the angle bar 2 is bent at its ends to conform to the curvature of the band or strap 1 and is secured thereto by rivets, the saddles 3 being interposed between the free ends of the band or strap 1 and the bent ends of the angle bar and are secured by the rivets which as before explained connect the bent end of the angle bar to the free ends of the band or strap. The saddles 3 are made of strap metal and the outwardly bent and curved ends thereof are separated sufficiently to receive and engage the opposite side edges of the rim and operate to hold the latter against displacement.

The band or strap constituting the carrier is offset or depressed at the points 1ª, and to the inner face of one of these depressed portions, is riveted the metal strip 5 which latter is preferably the same width as the strap or band 1, and terminates at its free end approximately at the centre of the bottom of the carrier, the free end of said strap 5 being bent upwardly as at 6. The said bent end is provided with a hole 7 registering with a similar hole in the sheet metal bracket 8 secured to the inner face of the carrier adjacent the free end of the strip 5, the said holes in the strip and bracket adapted to receive the shackle of a lock or other device for locking the free end of the strip 5 against movement.

Secured to the lower face of the free end of the strip 5 is the saddle 9 having upturned shoulders 10 and 11, the rear shoulder 11 being elongated as shown with its free end bent or inclined upwardly and in a position to be engaged by the rim during the act of applying a rim to the carrier. This saddle 9 is located in a plane approximately midway the saddles 3, and is adapted to engage the lower part of the rim and together with the saddles 3, lock the rim in place against possibility of accidental displacement. The strip 5 is made of spring metal, and normally holds the end shoulders of saddle 9 projecting beyond the carrier, but when not locked as previously explained, is free to be forced upwardly by the contact of the rim with the inclined outer face of the shoulder 11 of saddle 9 and thus permit the rim to be placed on the carrier.

As previously stated, the carrier instead of being in the segment of a circle may be in the form of a complete circle as shown in dotted lines in Figure 2, as the shape of the carrier is really unimportant.

In applying a rim or wheel to the carrier, the rim should be properly seated on the top saddles 3, and then by forcing the edge of the rim against the inclined shoulder 11 of saddle 9, the strip 5 will yield or give and thus allow the rim to pass onto the carrier, the saddle 9 springing into the locking position, as the rim passes under the said shoulder 11. After the rim has been properly mounted on the carrier, it can be locked against displacement or removal by inserting the hasp of a lock through the holes in the upwardly turned end of the strip 5 and the bracket 8, or by any other approved locking means.

To remove the rim, the free end of the saddle carrying spring strip 5 is disconnected from the bracket 8, thus leaving the rim free to be pulled over shoulder 11 of saddle 9, the strip carrying the said saddle giving or yielding under the side pull on the rim or tire. As soon as the rim passes from off the lug 11, the spring strip springs back into position and is yieldingly retained thereon until again depressed by the contact with a rim.

In the construction shown in Figure 4, the lug 10 is rigidly secured to the carrier 1 and the lug 11 secured to the spring strip 5, so that the lug 11 moves with the strip, its companion lug 10 being rigid with the carrier and always in position to form a stop or abutment for the rim.

This construction is exceedingly simple and inexpensive and can readily be assembled by unskilled labor.

Having fully described our invention what we claim as new and desire to secure by Letters Patent, is:—

1. In a tire carrier, the combination of a supporting member having a plurality of rim supporting saddles, and a yielding support for one of said saddles the said support being carried by the supporting member.

2. In a tire carrier, the combination of a rim supporting member having a plurality of pairs of rim retaining lugs, a yielding support for one of said lugs and means for locking said yielding support against movement.

3. In a tire carrier, the combination of a rim supporting member carrying a fixed saddle having end lugs for engaging the rim, and a spring strip secured to said member and provided at its free end with a saddle having end lugs to engage the opposite edges of a rim.

4. In a tire carrier, the combination of a rim supporting member, a saddle rigidly secured thereto and provided at its ends with rim engaging lugs, a spring strip secured to said member and provided at its free end with a rim engaging lug the latter having an inclined outer end, and means for locking said spring strip against movement.

5. In a tire carrier, the combination of a rim supporting member having a plurality of fixed rim supporting lugs and a spring strip secured at one end to said member and free at its other end and provided at its free end with a lug having inclined surfaces adapted to be engaged by the rim and moved out of the path of movement of the rim.

6. In a tire carrier, the combination of a rim supporting member having a plurality of fixed saddles each of the latter having outwardly turned ends, a spring strip secured at one end to said member and free at its other end, and a saddle secured to said free end, the said saddle having outwardly turned ends adapted to engage the opposite side edges of a rim.

7. In a tire carrier, the combination of a rim supporting member having a plurality of fixed saddles each of the latter having outwardly turned ends, a bracket rigidly secured to said member and projecting inwardly therefrom, a spring strip secured at one end to said member and free at its other end, its free end being bent at right angles and resting in close proximity to the bracket and a rim holding saddle secured to the spring strip adjacent to the free end of the latter and resting in a plane intermediate the fixed saddles.

In testimony whereof, we have signed this specification in the presence of two subscribing witnesses.

CHARLES C. STEEL.
THOMAS H. LYNN.

Witnesses:
FLORENCE ODELL GREIR,
HELEN S. SHEEHAN.